(12) United States Patent
Nozaki et al.

(10) Patent No.: US 7,975,791 B2
(45) Date of Patent: Jul. 12, 2011

(54) HYBRID VEHICLE DRIVE CONTROL SYSTEM

(75) Inventors: Yuji Nozaki, Kawasaki (JP); Kiminori Nakamura, Isehara (JP)

(73) Assignee: Nissan Motor Co., Ltd., Yokohama (JP)

( * ) Notice: Subject to any disclaimer, the term of this patent is extended or adjusted under 35 U.S.C. 154(b) by 811 days.

(21) Appl. No.: 11/594,251

(22) Filed: Nov. 8, 2006

(65) Prior Publication Data
US 2007/0114082 A1 May 24, 2007

(30) Foreign Application Priority Data

Nov. 9, 2005 (JP) ................................. 2005-324296

(51) Int. Cl.
B60K 1/00 (2006.01)
B60K 6/20 (2007.10)
B60W 20/00 (2006.01)
(52) U.S. Cl. ................ 180/65.6; 180/65.21; 180/65.265
(58) Field of Classification Search .................. 903/917; 477/2, 5, 6
See application file for complete search history.

(56) References Cited

U.S. PATENT DOCUMENTS

| | | | | |
|---|---|---|---|---|
| 5,982,045 A * | 11/1999 | Tabata et al. | ..................... | 290/17 |
| 6,176,807 B1 | 1/2001 | Oba et al. | | |
| 6,176,808 B1 * | 1/2001 | Brown et al. | ...................... | 477/5 |
| 6,244,368 B1 | 6/2001 | Ando et al. | | |
| 6,991,585 B2 * | 1/2006 | Colvin et al. | .................. | 477/174 |
| 7,351,182 B2 * | 4/2008 | Kobayashi | .......................... | 477/5 |
| 7,370,715 B2 * | 5/2008 | Colvin et al. | .............. | 180/65.28 |
| 2001/0017470 A1 * | 8/2001 | Takaoka et al. | ............. | 290/40 C |
| 2003/0125161 A1 * | 7/2003 | Tokura et al. | .................. | 477/176 |
| 2005/0082098 A1 * | 4/2005 | Ito et al. | ........................ | 180/65.2 |
| 2005/0155803 A1 * | 7/2005 | Schiele | ......................... | 180/65.2 |
| 2005/0221947 A1 * | 10/2005 | Mesiti et al. | ....................... | 477/5 |
| 2006/0090940 A1 * | 5/2006 | Ito et al. | ........................ | 180/65.2 |
| 2007/0056783 A1 * | 3/2007 | Joe et al. | ....................... | 180/65.2 |
| 2008/0195266 A1 * | 8/2008 | Le Neindre et al. | ............ | 701/22 |

FOREIGN PATENT DOCUMENTS

| | | |
|---|---|---|
| DE | 103 27 306 A1 | 1/2005 |
| DE | 102004002061 | 8/2005 |
| FR | 0550543 * | 3/2005 |
| JP | H11-82260 A | 6/1999 |
| JP | 2000-255285 | 9/2000 |
| JP | 2003-004138 | 1/2003 |
| JP | 2005-221073 | 8/2005 |
| WO | WO 2006092524 A1 * | 9/2006 |

* cited by examiner

*Primary Examiner* — Hau V Phan
*Assistant Examiner* — Chiedu A Chibogu
(74) *Attorney, Agent, or Firm* — Global IP Counselors, LLP

(57) ABSTRACT

A hybrid vehicle drive control system has a first clutch interposed between an engine and a motor/generator, a transmission including several gear position clutches arranged between the motor/generator and a drive wheel, and a controller. The controller selectively starts the engine using torque from the first clutch during a drive mode change from an electric drive mode to a hybrid drive mode. When an engine start command and a gear shifting operation occur during a drive mode change, the controller selects the gear position clutch that is a common engaged clutch from among the engaged gear position clutches constituting the vehicle running gears occurring from immediately before starting the engine until immediately after starting the engine as a second clutch to be controlled. Then, the controller executes a slip control of the second clutch when the first clutch is being connected to start the engine during the drive mode change.

10 Claims, 7 Drawing Sheets

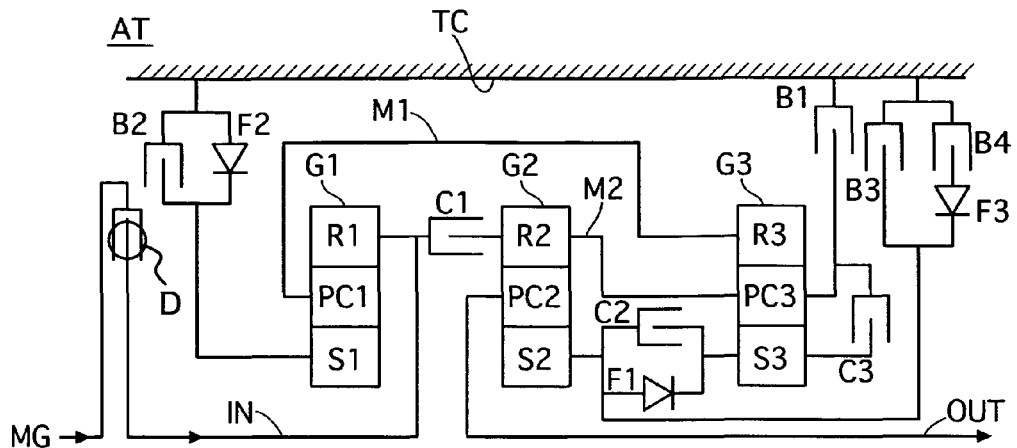

Fig. 7

|  | C1 | C2 | C3 | B1 | B2 | B3 | B4 | F1 | F2 | F3 |
|---|---|---|---|---|---|---|---|---|---|---|
| 1st |  | (O)* |  |  | ● | (O) | O |  | △ | △ |
| 2nd |  |  | O |  | (O) | (O) | O |  | △ | △ |
| 3rd |  | O | O |  | (O) |  | ● | C | △ |  |
| 4th | O | O | O |  |  |  | ● | C |  |  |
| 5th | O | O |  |  | O |  | ● | C | C |  |
| Rev |  | O |  | O | O |  |  | △ | △ |  |

△ : PARTICIPATES IN TORQUE TRANSMISSION IN POWER-ON MODE
C : CONTRIBUTES TO TORQUE TRANSMISSION DURING COASTING
● : HYDRAULIC PRESSURE FED TO FRICTION ELEMENTS, BUT OUTPUT IS NOT AFFECTED THEREBY
(O) : ENGAGES IN OVERRUN MODE
(O)* : ENGAGES DURING SELECTION, RELEASED AFTERWARD WHEN OVERRUN MODE NOT IN EFFECT
O : ENGAGES

Fig. 8

HYBRID VEHICLE DRIVE CONTROL SYSTEM

CROSS-REFERENCE TO RELATED APPLICATIONS

This application claims priority under 35 U.S.C. §119 to Japanese Patent Application No. 2005-324296 filed on Nov. 9, 2005. The entire disclosure of Japanese Patent Application No. 2005-324296 is hereby incorporated herein by reference.

BACKGROUND OF THE INVENTION

1. Field of the Invention

The present invention relates to a hybrid vehicle drive control system of a hybrid vehicle having an electric drive (EV) mode a hybrid drive (HEV) mode. More particularly, the present invention relates to a hybrid vehicle drive control system for starting an engine of a hybrid vehicle having a first clutch is interposed between the engine and a motor/generator, and a second clutch is interposed between the motor/generator and a drive wheel, with one of a plurality of clutches disposed within a transmission being used as the second clutch.

2. Background Information

Various configurations have been proposed for hybrid vehicle drive systems used in such hybrid vehicles. In hybrid vehicle, an engine and a motor/generator are used to provide a driving force to one or more drive wheels. A hybrid vehicle equipped with a hybrid vehicle drive control system can be put into an electric drive (EV) mode in which the vehicle travels solely by means of power from the motor/generator. Such a hybrid vehicle can also be put into a hybrid drive (HEV) mode in which the vehicle travels using power from both the engine and the motor/generator. In the electric drive (EV) mode, the engine is stopped when it is not needed and then started when it is determined to be needed, according to prescribed vehicle operating conditions. Typically, with most vehicles, the engine is idle when the vehicle is stationary. When the engine is engaged to transmit power, a control is performed for varying the capacity of the torque converter, with the clutches in the transmission being in completely engaged conditions. One example of such a drive control system is disclosed in Japanese Laid-Open Patent Publication No. 2003-004138.

In view of the above, it will be apparent to those skilled in the art from this disclosure that there exists a need for an improved hybrid vehicle drive control system. This invention addresses this need in the art as well as other needs, which will become apparent to those skilled in the art from this disclosure.

SUMMARY OF THE INVENTION

However, with hybrid vehicles, in which an engine and a motor/generator are used as power sources for driving the vehicle, the engine will occasionally be started when the vehicle is moving. When the engine is being started, the clutch in the transmission is in a completely engaged state. Therefore, the variations in the engine output torque generated in the period between cranking and the initial combustion is transmitted directly to the transmission output axle, which often generates a shock. In such instances, the passengers and the driver in particular will be subjected to an unpleasant sensation because of this shock, which unexpectedly occurs while the vehicle is moving.

The present invention was conceived in view of the above-mentioned problem. One object of the present invention is to provide a hybrid vehicle drive control system for a hybrid vehicle in which simplified control logic eliminates a lack of torque when the engine is started under the electric drive mode accompanied by a shifting of gears, and makes it possible to prevent the incidence of engine starting shock.

In order to achieve the aforementioned object and other objects, a hybrid vehicle drive control system in accordance with the present invention is basically provided with an engine, a motor/generator, a first clutch, a transmission and a controller. The first clutch is arranged between the engine and the motor/generator. The transmission includes a plurality of gear position clutches arranged between the motor/generator and at least one drive wheel of a hybrid vehicle, with the gear position clutches being selectively engaged to obtain one of a plurality of vehicle running gears. The controller is configured to selectively start the engine by using torque transmitted from the first clutch during a mode change from an electric drive mode in which the first clutch is released to a hybrid drive mode in which the first clutch is engaged when an engine start command is issued while the hybrid vehicle is running in the electric drive mode with the motor/generator being used as a power source for driving the drive wheel of the hybrid vehicle. The controller is further configured to select a second clutch that is detected as being a common engaged clutch among the gear position clutches that are engaged to constitute the vehicle running gears occurring from immediately before starting the engine until immediately after starting the engine when the engine start command is issued to start the engine and a gear shifting operation is occurring during the mode change from the electric drive mode to the hybrid drive mode, and to execute a slip control of the second clutch when the first clutch is being connected to start the engine during the mode change from the electric drive mode to the hybrid drive mode.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 7 is a schematic skeleton diagram illustrating the power train of the automatic transmission used in the hybrid vehicle drive control system in accordance with the illustrated embodiment of the present invention;

FIG. 8 is a clutch and brake engagement operating chart for the automatic transmission in the hybrid vehicle drive control system in accordance with the illustrated embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
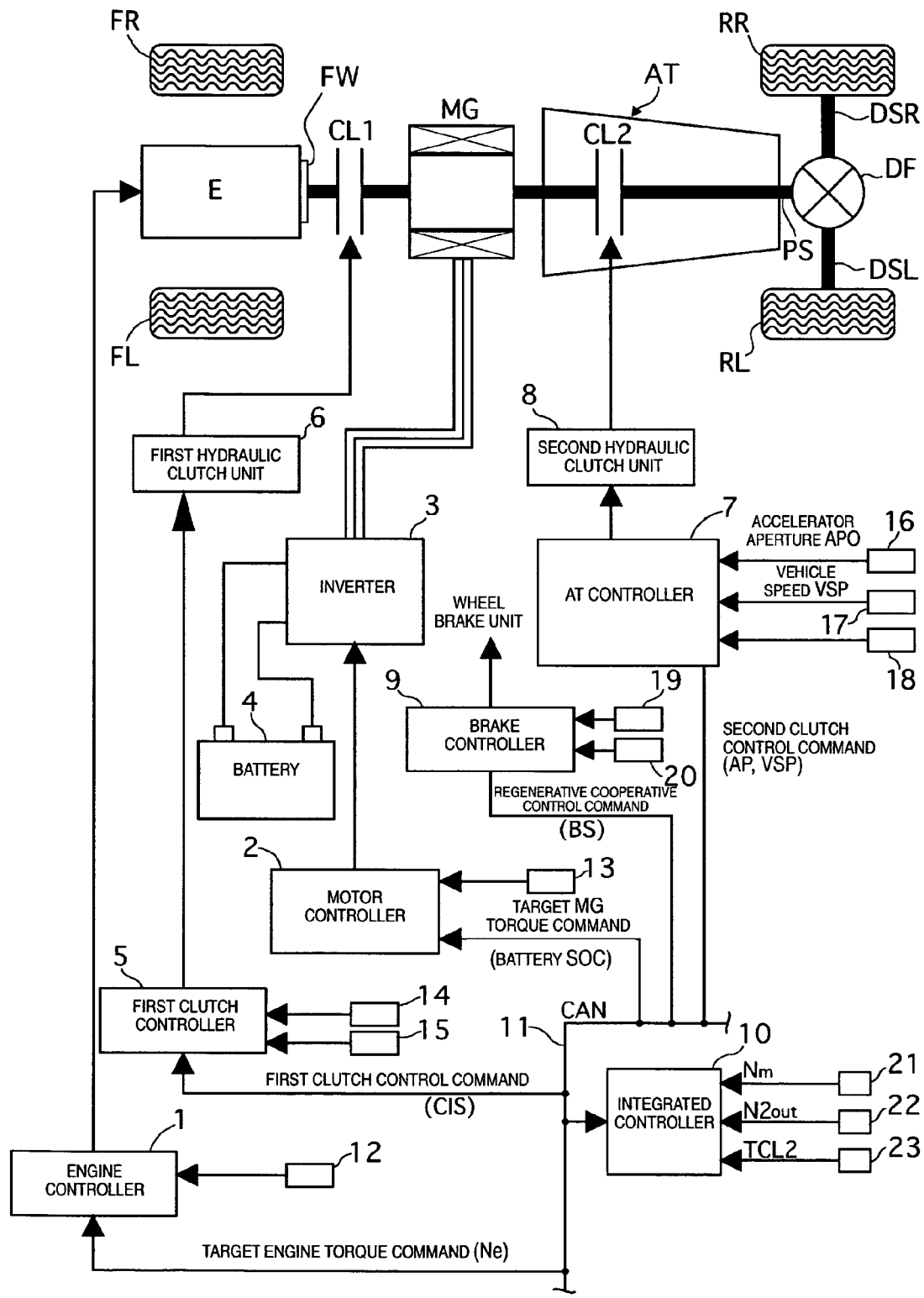
FIG. 1 is a schematic view of a power train of a hybrid vehicle with a hybrid vehicle drive control system in accordance with one embodiment of the present invention.

Referring initially to FIG. 1, a power train of a rear-wheel drive hybrid vehicle is schematically illustrated with a hybrid vehicle drive control system in accordance with a first embodiment of the present invention. As shown in FIG. 1, the hybrid vehicle drive control system of the first embodiment basically includes an internal combustion engine E, a flywheel FW, a first clutch CL1, a motor/generator MG, a second clutch CL2, an automatic transmission AT (gearbox), a propeller shaft PS, a differential gear unit DF, a left drive shaft DSL, a right drive shaft DSR, a left rear wheel RL (drive wheel), and a right rear wheel RR (drive wheel). In addition, the hybrid vehicle a front left wheel FL and a front right wheel FR.

The engine E is a gasoline or diesel engine in which various parameters are controlled by control commands from an engine controller 1, which is described later. For example, the engine controller 1 controls a throttle valve opening of a throttle valve. The flywheel FW is provided to an engine output shaft in a conventional manner.

The clutch CL1 is interposed between the engine E and the motor/generator MG to change a torque transfer capacity between the engine E and the motor/generator MG. In particular, a first clutch controller 5 and a first hydraulic clutch unit 6 are provided to control the engagement and release of the clutch CL1, including slip engagement and slip release. In other words, the operating state of the clutch CL1 is controlled by controlling the hydraulics generated by the first hydraulic clutch unit 6 according to a control command from the first clutch controller 5 described hereinafter.

The motor/generator MG is a synchronous motor/generator, in which a permanent magnet is embedded in a rotor and a stator coil is wound around a stator. The motor/generator MG is controlled by being selectively energized with three-phase alternating current delivered from an inverter 3 based on control commands issued from a motor controller 2 described hereinafter. The electrical power from the motor/generator MG can be selectively supplied to a battery 4 via the inverter 3. Thus, the motor/generator MG can operate as an electric motor that is rotatably driven on receiving a supply of electrical power from the battery 4 (this state is referred to as "power running" state), or, when the rotor is spinning due to an external force, can function as an electricity generator that produces a generating power on both ends of the stator coil so as to charge the battery 4 (this state is referred to as a "regeneration" state). In addition, the rotor of the motor/generator MG is connected to an input shaft of the automatic transmission AT via a damper (not shown).

The second clutch CL2 is interposed between the motor/generator MG and the left and right rear drive wheels RL and RR to change a torque transfer capacity between the motor/generator and the left and right rear drive wheels RL and RR. In particular, an AT controller 7 and a second hydraulic clutch unit 8 are provided to control the engagement and release of the clutch CL2, including slip engagement and slip release. In other words, the operating state of the clutch CL2 is controlled by controlling the hydraulics generated by the second hydraulic clutch unit 8 according to a control command from the AT controller 7 described hereinafter.

The automatic transmission AT automatically switches the gear position from among five forward gears and one reverse gear based on the vehicle speed, the accelerator position, or other parameters. The second clutch CL2 is not added as a special-purpose clutch, but is selected as the clutch with the maximum torque transfer capacity from a plurality of clutches engaged in the gear positions within the automatic transmission AT. An output shaft of the automatic transmission AT is connected to the left and right rear wheels RL, RR via the propeller shaft PS, the differential gear unit DF, the left drive shaft DSL and the right drive shaft DSR.

The first clutch CL1 and the second clutch CL2 are each configured such that the torque transfer capacity thereof can be changed in either a continuous fashion or a stepwise fashion. For example, the first clutch CL1 and the second clutch CL2 can be a multi-plate wet clutch configured such that its torque transfer capacity can be changed by controlling the flow rate of a hydraulic clutch fluid (hydraulic oil) and the pressure of the hydraulic clutch fluid (clutch connection hydraulic pressure) either continuously or in a stepwise fashion by a proportional solenoid. The hybrid drive system has two operating modes corresponding to the state of engagement or release of the first clutch CL1. In particular, the hybrid drive system includes an electric vehicle drive (EV) mode and a hybrid electric vehicle drive (HEV) mode. In the EV mode, the vehicle is driven solely by the power from the motor/generator MG, which occurs when the first clutch CL1 is in a released state. In the HEV mode, the vehicle is driven by the power from the engine E and the motor/generator MG, occurs when the first clutch CL1 is in an engaged state.

The control system for the hybrid vehicle will next be described.

As shown in FIG. 1, in accordance with a first embodiment, the control system for the hybrid vehicle further includes a brake controller 9, and an integrated controller 10 in addition to the engine controller 1, the motor controller 2, the inverter 3, the battery 4, the first clutch controller 5, the first hydraulic clutch unit 6, the AT controller 7, and the second hydraulic clutch unit 8 that were mentioned above. The engine controller 1, the motor controller 2, the first clutch controller 5, the AT controller 7, the brake controller 9, and the integrated controller 10 are connected via a CAN communication line 11, through which data can be exchanged. While multiple controllers are illustrated, it will be apparent to those skilled in the art from this disclosure that two or all of the controllers 1, 2, 5, 7, 9 and 10 can be combined into a single controller as needed and/or desired.

The engine controller 1 inputs data pertaining to the engine rotational speed (rpm's) as issued by an engine rotational speed sensor 12, and outputs to a throttle valve actuator (not shown) or the like a command for controlling the engine operating points (Ne and Te) according to a target engine torque command or the like issued by the integrated controller 10. The data for the engine rotational speed Ne is fed to the integrated controller 10 via the CAN communication line 11.

The motor controller 2 inputs the data from a resolver type sensor 13 that detects rotor rotation in the motor/generator MG, and outputs to the inverter 3 a command that controls the motor operating points (Nm and Tm) of the motor/generator MG according to a target motor/generator torque command from the integrated controller 10. The motor controller 2 monitors a state of charge SOC (usable electric power) of the battery 4. The state of charge SOC data is used as control data for the motor/generator MG, and is fed to the integrated controller 10 via the CAN communication line 11.

The first clutch controller 5 inputs sensor data issued by a first clutch hydraulic sensor 14 and a first clutch stroke sensor 15. The first clutch controller 5 then outputs a control command to the first hydraulic clutch unit 6 for controlling the engagement and release of the first clutch CL1 according to the first clutch control command issued by the integrated controller 10. The data from a first clutch stroke CIS is fed to the integrated controller 10 via the CAN communication line 11.

The AT controller 7 inputs sensor data issued by an accelerator position sensor 16, a vehicle speed sensor 17, and a second clutch hydraulic sensor 18. The AT controller 7 then outputs a control command to the second hydraulic clutch unit 8 within an AT hydraulic controller valve for controlling the engagement and release of the second clutch CL2 according to a second clutch control command issued by the integrated controller 10. The data relating to the current values for an accelerator position (throttle opening) APO and a vehicle speed VSP is supplied to the integrated controller 10 via the CAN communication line 11.

The brake controller 9 inputs sensor data issued by a wheel speed sensor 19 for detecting the speeds of each of the four wheels, and a brake stroke sensor 20. When, for example, a brake is depressed for braking, and the regenerative braking force is inadequate in regard to the required braking force needed by the brake stroke BS, the brake controller 9 executes regenerative cooperative brake control according to a regenerative cooperative control command issued by the integrated controller 10, so that the mechanical braking force (hydraulic braking force and motor braking force) will compensate for the deficiency.

The integrated controller 10 manages the energy consumed by the entire vehicle, and serves to make the vehicle run at maximum efficiency. The controller 10 inputs data issued by a motor speed sensor 21 for detecting the motor speed Nm, a second clutch output rotation sensor 22 for detecting the number of second clutch output rotations N2out, and a second clutch torque sensor 23 for detecting second clutch torque TCL2; as well as data obtained via the CAN communication line 11.

The integrated controller 10 controls the operations of the engine E according to a control command to the engine controller 1, the operations of the motor/generator MG according to a control command to the motor controller 2, the engagement and release of the first clutch CL1 according to a control command to the first clutch controller 5, and the engagement and release of the second clutch CL2 according to a control command to the AT controller 7.

Figure 2:
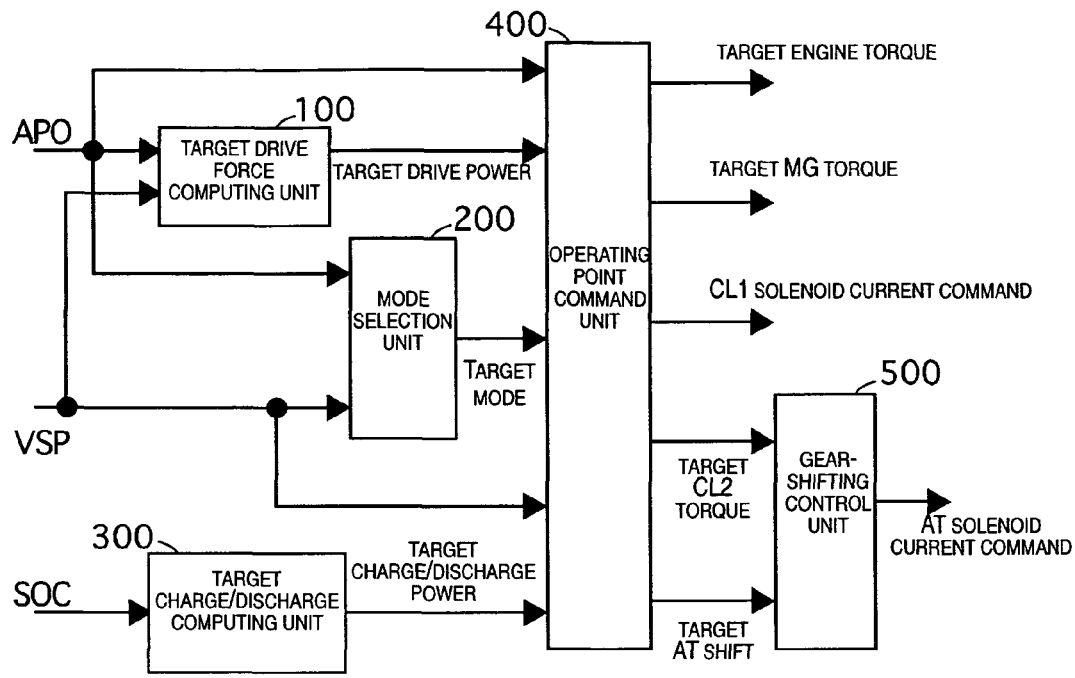
FIG. 2 is a block diagram of the integrated controller of the hybrid vehicle drive control system shown in FIG. 1 in accordance with the illustrated embodiment of the present invention.

The computation process executed by the integrated controller 10 in the first embodiment shall be described hereunder with reference to the block diagram shown in FIG. 2. For example, the computation process is carried out in 10 msec control cycle intervals by the integrated controller 10.

The integrated controller 10 has a target drive force computing unit or section 100, a mode selection unit or section 200, a target charge/discharge computing unit or section 300, an operating point command unit or section 400, and a gear-shifting control unit or section 500.

Figure 3:
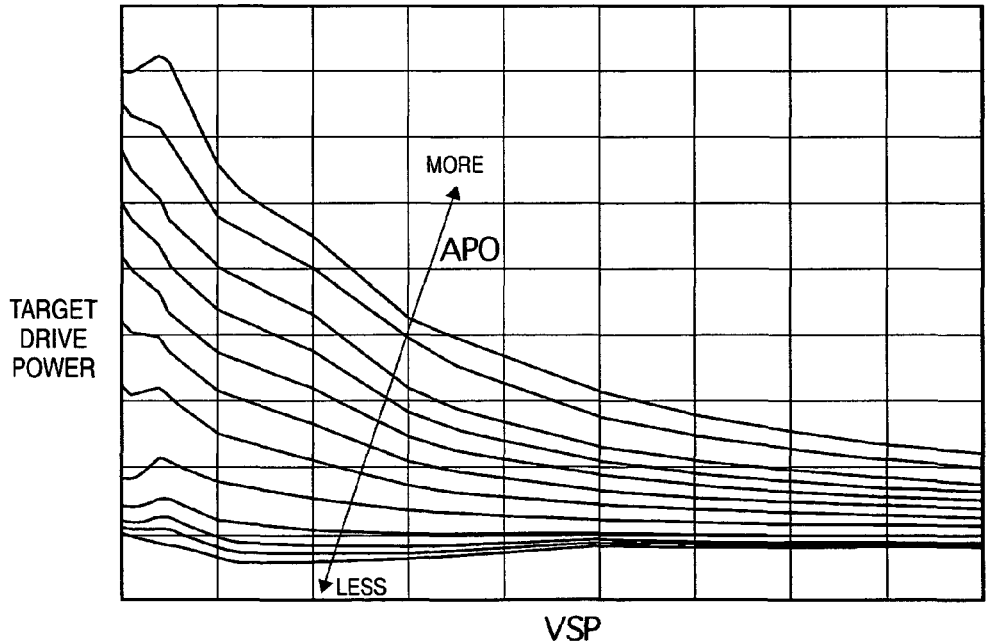
FIG. 3 is a characteristic curve diagram of a final target drive power map used by the target drive power computing unit of FIG. 2 to compute the final target drive power in accordance with the illustrated embodiment of the present invention.

The target drive force computing unit 100 computes a target drive force tFo0 based on the accelerator position APO and the vehicle speed VSP using a target drive force map, which is shown in FIG. 3.

Figure 4:
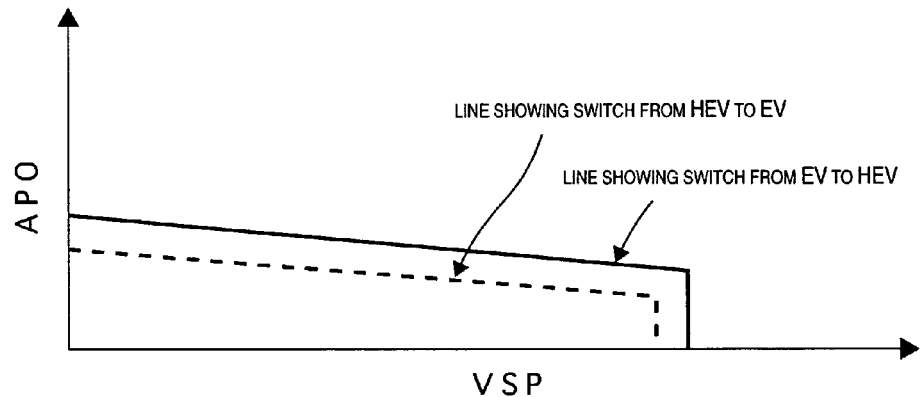
FIG. 4 is a plot illustrating an example of a target mode map used by the mode selecting unit of FIG. 2 to select a target mode (i.e., the electric drive (EV) mode region and hybrid drive (HEV) mode region of the hybrid vehicle.

The mode selection unit 200 computes a target mode based on the accelerator position APO and the vehicle speed VSP using an EV-HEV selection map, which is shown in FIG. 4. However, the HEV mode will be forcibly set as the target mode if the state of charge SOC of the battery 4 is at or below a prescribed value.

Figure 5:
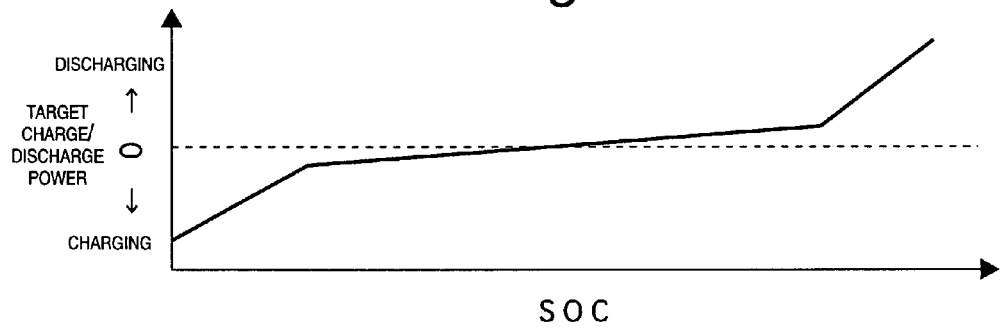
FIG. 5 is a characteristic curve diagram illustrating an example of a target charge/discharge amount map used by the target charge/discharge computing unit of FIG. 2 to compute target charge/discharge power in accordance with the illustrated embodiment of the present invention.

The target charge/discharge computing unit 300 computes a target charge/discharge power tP from the state of charge SOC of the battery 4 using a target charge/discharge quantity map, which is shown in FIG. 5.

Figure 6:
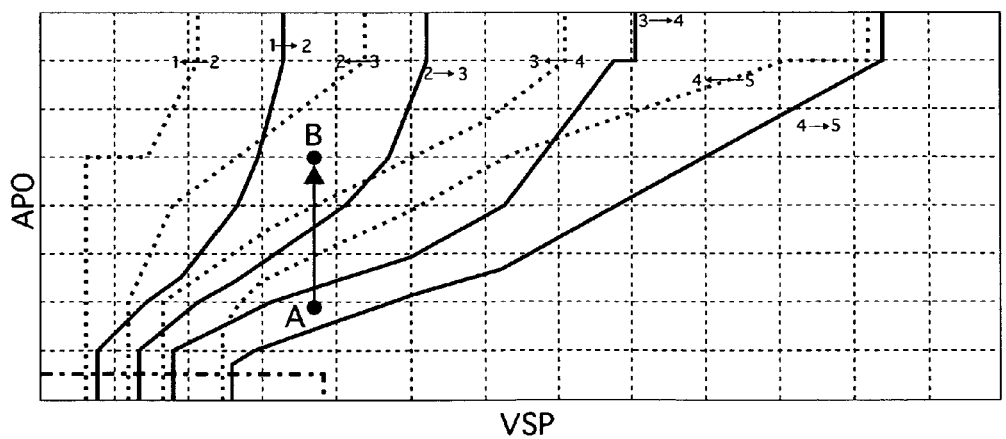
FIG. 6 is a gear change curve diagram an example of a shift map used by the operating point command section of FIG. 2 to compute target automatic shifting for the automatic transmission installed in the hybrid vehicle.

Based on the accelerator position APO, the target drive force tFo0, the target mode, the vehicle speed VSP and the target charge/discharge power tP, the operating point command unit 400 computes as targets to be attained for these operating points a transitional target engine torque, a target motor/generator torque, a target second clutch torque transfer capacity, a target automatic transmission shift, and a first clutch solenoid current command. The target automatic transmission shift is computed according to the accelerator position APO and the vehicle speed VSP using a shift map, which is shown in FIG. 6.

The gear-shifting control unit 500 controls the drive of a solenoid valve inside the automatic transmission AT according to the target second clutch torque transfer capacity and target automatic transmission shift so that these targets will be achieved.

FIG. 7 is a schematic skeleton diagram that shows a power train of the automatic transmission used in the hybrid vehicle drive system. FIG. 8 is a clutch and brake engagement operating chart based on the automatic transmission AT used in the hybrid vehicle drive system.

As shown in FIG. 7, the automatic transmission AT is provided with three simple planetary gear sets G1, G2 and G3. The front planetary gear set G1 has a front sun gear S1, a front carrier PCI, and a front ring gear R1 as rotating elements. The mid planetary gear set G2 has a mid sun gear S2, a mid carrier PC2, and a mid ring gear R2 as rotating elements. The rear planetary gear set G3, which has a rear sun gear S3, a rear carrier PC3, and a rear ring gear R3 as rotating elements. As shown in FIG. 7, the automatic transmission AT has an input shaft IN that receives a rotation drive torque from either the motor/generator MG alone, or from the engine E and the motor/generator MG together via a damper D. As shown in FIG. 7, the automatic transmission AT has an output shaft OUT is an output shaft that outputs a rotation drive torque to the left and right rear drive wheels RL and RR via the automatic transmission AT.

The automatic transmission AT has a plurality of frictional engagement elements (clutches and brakes) that can be selectively engaged and disengaged such that the power transmission path (e.g., first gear, second gear, etc.) is determined based on the combination of the engaged and disengaged frictional engagement elements. The automatic transmission AT transfers the rotation of the input shaft IN to the output shaft OUT after converting the rotation at a gear ratio corresponding to the selected gear. The rotation of the output shaft OUT is distributed to the left and right rear drive wheels RL and RR by the differential gear unit DF, the left drive shaft DSL, and the right drive shaft DSR, and thereby contributes to moving the vehicle. In particular, in the illustrated embodiment, the friction elements of the automatic transmission AT includes an input clutch C1, a high/low reverse clutch C2, a direct clutch C3, a reverse brake B1, a front brake B2, a low coast brake B3, a forward brake B4, a first one-way clutch F1, a third one-way clutch F2, and a forward one-way clutch F3. Thus, by selectively engaging and disengaging these frictional engagement elements of the automatic transmission AT, five forward gears can be obtained as well as one reverse gear. The clutches of the automatic transmission AT are generally referred to as gear position clutches that are selectively engaged and disengaged to obtain the desired gear position (e.g., $1^{st}$ gear, $2^{nd}$ gear, $3^{rd}$ gear, etc.)

The input clutch C1, on being released, connects the front ring gear R1 to the input shaft IN, and on being engaged connects the front ring gear R1 and the mid ring gear R2 to the input shaft IN. The high/low reverse clutch C2, on being engaged, connects the mid sun gear S2 and the rear sun gear S3. The direct clutch C3, on being engaged, connects the rear sun gear S3 and the rear carrier PC3.

The reverse brake B1, on being engaged, secures the rear carrier PC3 in place to a transmission case TC. The front brake B2, on being engaged, secures the front sun gear S1 in place to the transmission case TC. The low coast brake B3, on being engaged, secures the mid sun gear S2 in place to the transmission case TC. The forward brake B4, on being engaged, secures the mid sun gear S2 in place to the transmission case TC.

The first one-way clutch F1 frees rotation in the forward direction of the rear sun gear S3 with respect to the mid sun gear S2 (i.e., in the same direction of rotation as that of the engine), and locks reverse rotation. The third one-way clutch F2 frees rotation in the forward direction of the front sun gear S1 and locks reverse rotation. The forward one-way clutch F3 frees rotation in the forward direction of the mid sun gear S2 and locks reverse rotation.

The output shaft OUT is directly connected to the mid carrier PC2. The front carrier PC1 and the rear ring gear R3 are directly connected via a first member M1. The mid ring gear R2 and the rear carrier PC3 are directly connected via a second member M2.

As shown in the engagement operating chart in FIG. 8, the automatic transmission AT reaches first gear via the engagement of the high/low reverse clutch C2, the front brake B2, the low coast brake B3, and the forward brake B4. The automatic transmission AT shifts to second gear via the engagement of the direct clutch C3, the front brake B2, the low coast brake B3, and the forward brake B4. The automatic transmission AT shifts to third gear via the engagement of the high/low reverse clutch C2, the direct clutch C3, the front brake B2, and the forward brake B4. The automatic transmission AT shifts to fourth gear via the engagement of the input clutch C1, the high/low reverse clutch C2, the direct clutch C3, and the forward brake B4. The automatic transmission AT shifts to fifth gear via the engagement of the input clutch C1, the high/low reverse clutch C2, the front brake B2, and the forward brake B4. The automatic transmission AT shifts to reverse gear via the engagement of the high/low reverse clutch C2, the reverse brake B1, and the front brake B2.

Figure 9:
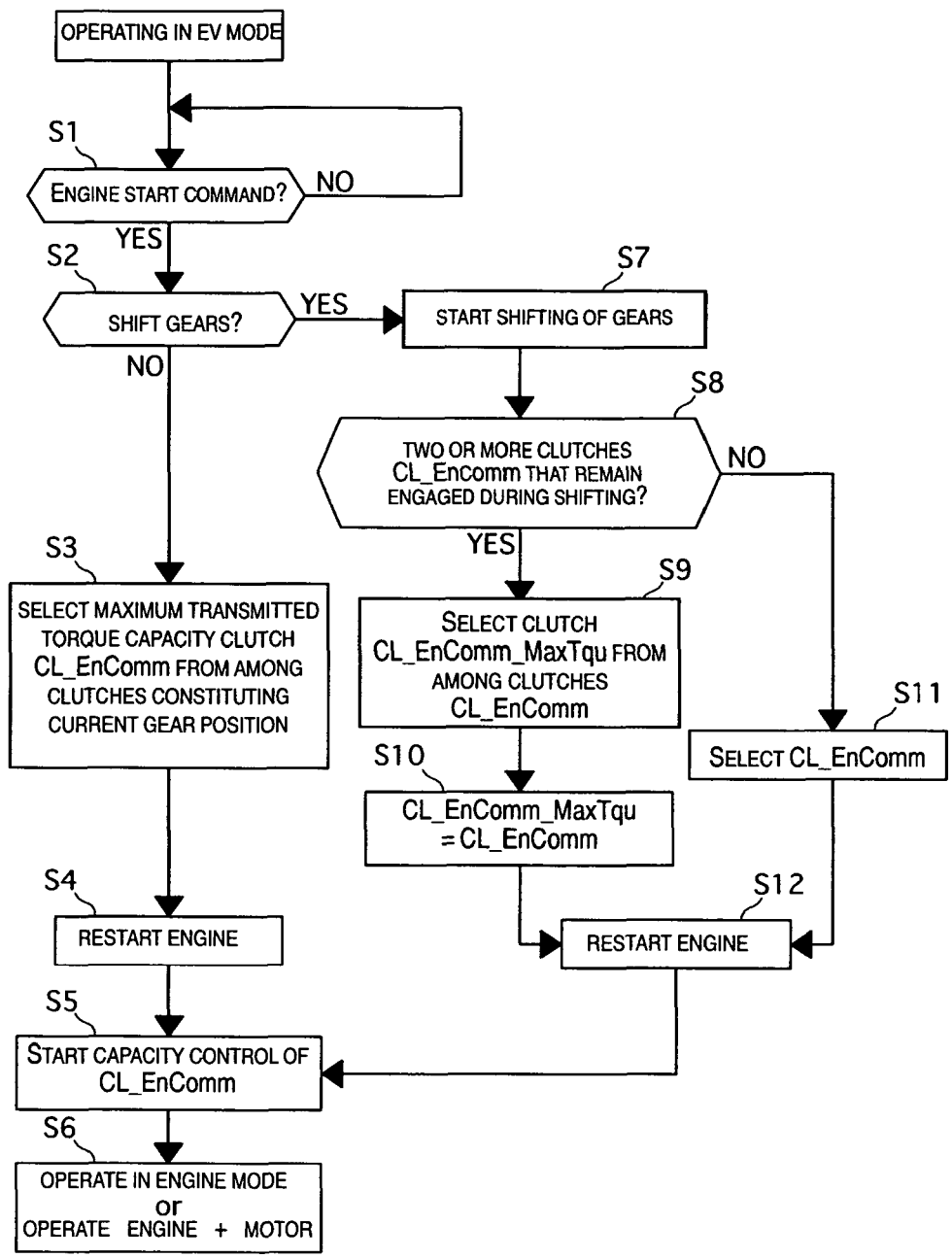
FIG. 9 is a flowchart showing a hybrid vehicle drive control program executed by the integrated controller during engine starting in accordance with the illustrated embodiment of the present invention.

FIG. 9 is a flow chart showing the flow of the engine starting control process executed by the integrated controller 10 of the first embodiment when the vehicle is running under the EV mode. The individual steps are described below (engine starting control). The process starts when an engine starting command is generated when the vehicle is running under the EV mode.

In step S1, the integrated controller 10 determines whether an engine starting command has been issued. If the answer is Yes, the process moves to step S2, while if the answer is No, the step S1 is repeated. The "engine starting command" is issued, e.g., when the battery SOC has reached or fallen below a prescribed value while the vehicle is running under the EV mode, and the target mode is forcibly changed from EV mode to HEV mode, or the driver performs a kickdown operation (demand for extra speed) when the vehicle is running under the EV mode, and the target mode changes from the EV mode to the HEV mode as a result.

In step S2, following a decision in step S1 that an engine starting command has been issued, the integrated controller 10 determines whether gears should be shifted along with the transition from EV to HEV mode once the engine has been started. If the answer is Yes, then the process moves to step S7, and if the answer is No, then the process moves to step S3.

In step S3, following a decision in step S2 that the gears are not shifted, a clutch CL_EnComm whose capacity is to be controlled is selected as the clutch with the maximum torque transfer capacity among the gear position clutches constituting the current gear positions in the automatic transmission AT. In other words, this one of the gear position clutches is then designated as a maximum torque transfer capacity clutch CL_EnComm, which is also designated as the second clutch CL2 in FIG. 1. For example, as seen in FIG. 8, when the gear position of the automatic transmission AT is in the fourth gear, the gear position clutches that constitute the fourth gear are the input clutch C1, the high/low reverse clutch C2 and the direct clutch C3. The integrated controller 10 then determines, for example, that the direct clutch C3 among these gear position clutches C1, C2 and C3 is the one with the maximum torque transfer capacity CL_EnComm whose capacity is to be controlled. Thus, in step S3, the integrated controller 10 selects the direct clutch C3 as the second clutch CL2, which has the maximum torque transfer capacity CL_EnComm. Step S3 constitutes a maximum torque transfer capacity clutch detection section of the integrated controller 10. Next, the process moves to step S4.

In step S4, following the selection of the maximum torque transfer capacity clutch CL_EnComm whose capacity is to be controlled in step S3, the engine E is started, whereupon the process moves to step S5. When "starting the engine", the motor/generator MG is used as a starter motor, and the engine E, which is stopped, is started by slip engagement of the first clutch CL1 such that a drag torque of the first clutch CL1 starts the engine E.

In step S5, following starting the engine in step S4, the torque transfer capacity control of the selected maximum torque transfer capacity clutch CL_EnComm (the second clutch CL2) whose capacity is to be controlled is initiated, whereupon the process moves to step S6.

Figure 10:
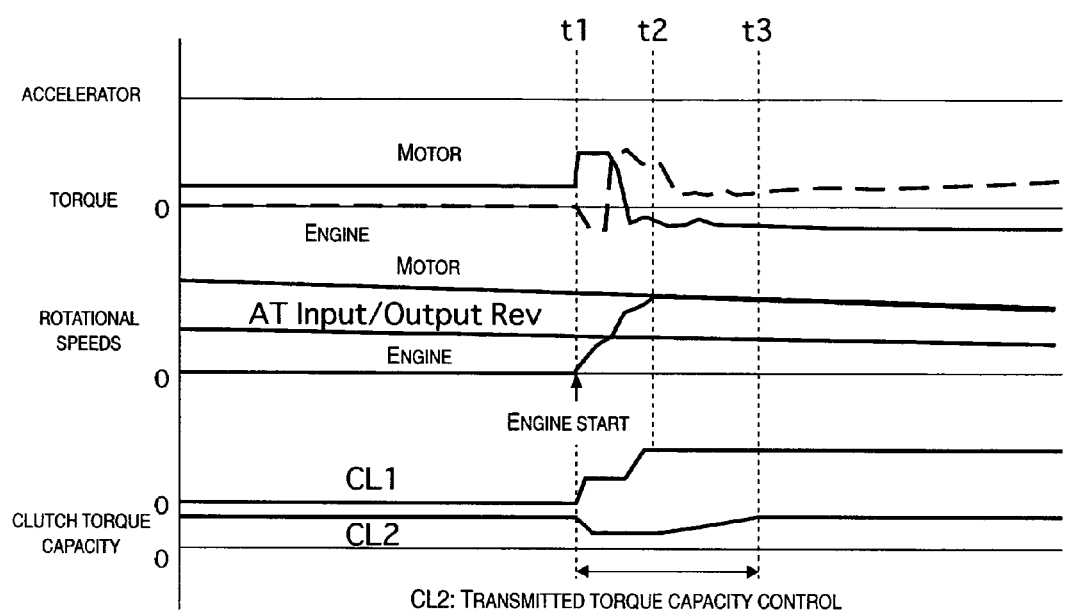
FIG. 10 is an operation time chart illustrating the operational effects on the accelerator, the torque, the number of rotations, and the clutch torque transfer capacity during engine starting caused by a decrease in the state of charge in the state of charge SOC of the battery 4 while operating in the EV mode in accordance with the illustrated embodiment of the present invention.
Figure 11:
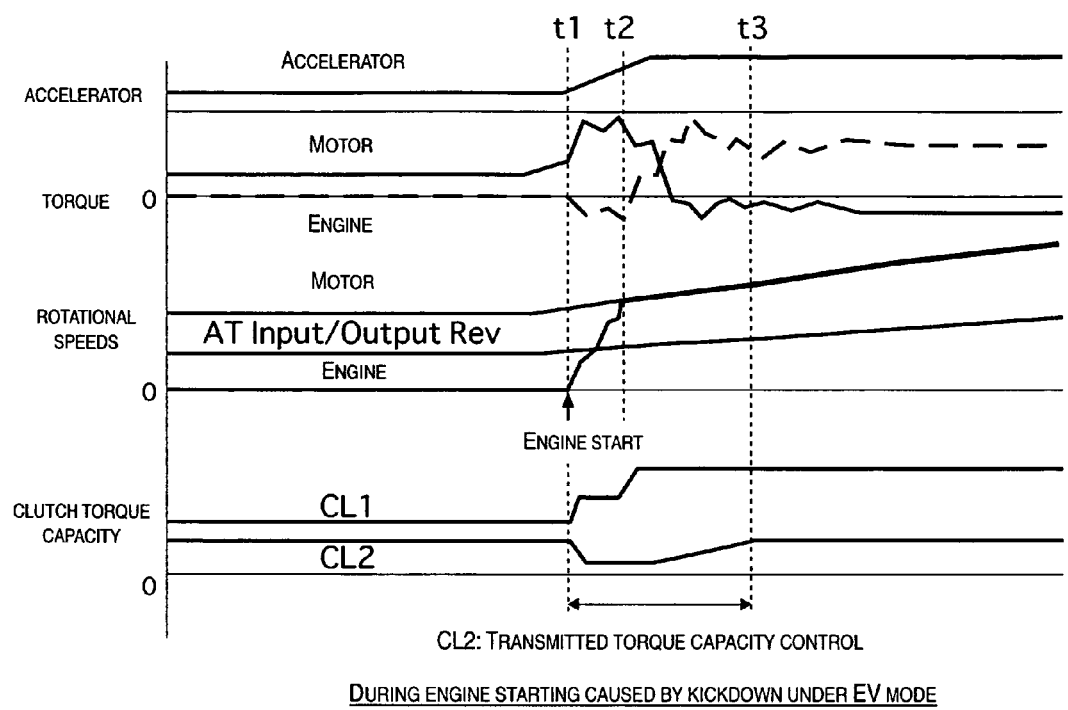
FIG. 11 is an operation time chart illustrating the operational effects on the accelerator, the torque, the number of rotations, and the clutch torque transfer capacity during engine starting caused by a kickdown situation occurring while operating in the EV mode in accordance with the illustrated embodiment of the present invention.

If a completely engaged maximum torque transfer capacity clutch CL_EnComm has been selected as the second clutch CL2 during engine starting, "torque transfer capacity control of the maximum torque transfer capacity clutch" reduces the torque transfer capacity of the second clutch CL2 while the engine E is started (refer to the second clutch CL2 torque transfer capacity control characteristics shown in FIGS. 11 and 12). In other words, "capacity control of the clutch CL_EnComm whose capacity is to be controlled" is performed by reducing the torque transfer capacity of the second clutch CL2 that is completely engaged in order to hold the gear position while the engine E is started (refer to the CL2 torque transfer capacity control characteristics shown in FIGS. 10 and 11).

In step S6, following the start of capacity control of the maximum torque transfer capacity clutch CL_EnComm whose capacity is to be controlled in step S5, i.e., engine starting has been concluded, the process moves to the HEV mode (operation of the engine E alone or in combination with the motor/generator MG) from the point where capacity control of the clutch CL_EnComm whose capacity is to be controlled has concluded.

In step S7, following the decision in step S2 that gears were to be shifted, the gears are shifted and the process moves to step S8. "Shifting gears" includes downshifting one gear (e.g., $5^{th}$ gear→$4^{th}$ gear, $4^{th}$ gear→$3^{rd}$ gear, and $3^{rd}$ gear→$2^{nd}$ gear), sequential downshifting two gears (e.g., $5^{th}$ gear→$4^{th}$ gear→$3^{d}$ gear, and $4^{th}$ gear→$3^{rd}$ gear→$2^{nd}$ gear), and block-downshifting two gears (e.g., $5^{th}$ gear→$3^{rd}$ gear, and $4^{th}$ gear→$2^{nd}$ gear).

In step S8, following the start of gear shifting in step S7, the integrated controller 10 determines whether there are two or more clutches CL_EnComm whose capacity is to be controlled that remain engaged throughout the shifting of the gears. If the answer is Yes, the process moves to step S9, and if the answer is No (only one clutch CL_EnComm whose capacity is to be controlled remains engaged throughout the shifting of the gears), the process moves to step S11.

For example, as shown in FIG. 8, in the automatic transmission AT of illustrated embodiment, if the shifting pattern is $5^{th}$ gear→$4^{th}$ gear or $4^{th}$ gear→$3^{rd}$ gear, then two clutches CL_EnComm whose capacities are to be controlled will remain engaged throughout the shifting of the gears, while if the shifting pattern is $3^{rd}$ gear→$2^{nd}$ gear, $5^{th}$ gear→$3^{rd}$ gear, $4^{th}$ gear→$2^{nd}$ gear, $5^{th}$ gear→$4^{th}$ gear→$3^{rd}$ gear, or $4^{th}$ gear→$3^{rd}$ gear→$2^{th}$ gear, then only one clutch CL_EnComm whose capacity is to be controlled will remain engaged throughout the shifting of the gears.

In step S9, following the decision in step S8 that two or more clutches CL_EnComm whose capacities are to be controlled will remain engaged throughout the shifting of the gears, the maximum torque transfer capacity clutch CL_EnComm_MaxTqu is selected from among the two or more clutches CL_EnComm whose capacity is to be controlled, whereupon the process moves to step S10.

In step S10, following the selection in step S9 of the maximum torque transfer capacity clutch CL_EnComm_MaxTqu, the selected maximum torque transfer capacity clutch CL_EnComm_MaxTqu is designated as the clutch CL_EnComm whose capacity is to be controlled, whereupon the process moves to step S12.

In step S11, following the decision in step S8 that only one clutch CL_EnComm whose capacity is to be controlled will remain engaged throughout the shifting of the gears, the common engaged clutch CL_EnComm is designated as the clutch CL_EnComm whose capacity is to be controlled, whereupon the process moves to step S12.

In other words, steps S8 through S11 correspond to the common engaged clutch detection section, which, when a command is issued to starting the engine accompanied by a shifting of gears, detects the common engaged gear position clutch among the engaged gear position clutches in the automatic transmission AT constituting the gear positions that are passed through when the engine E is started; and, when there is a plurality of common engaged gear position clutches for the gear positions that are passed through when the engine E is started, further selects the clutch with the maximum torque transfer capacity among the plurality of common engaged gear position clutches as the second clutch whose maximum torque transfer capacity is to be controlled.

In step S12, following the designation in steps S10 or S11 of the clutch CL_EnComm whose capacity is to be controlled, engine starting is concluded, whereupon the process moves to step S5 as discussed above.

The actions shall now be described.

In hybrid vehicles having an engine and a motor/generator as propulsion devices, the engine will be stopped if it is not required, and started at the point in time that the engine E is deemed necessary (e.g., when the state of charge SOC of the battery 4 has decreased or the driver requires acceleration torque), based on conditions determined in advance by the vehicle operating state.

However, with hybrid vehicles, the engine E is started at the point in time that it is deemed necessary; even when the vehicle is in motion. When the engine E is started, the clutches constituting the gear position in the automatic transmission will be in a completely engaged state. Therefore, the variation in the engine output torque generated in the period between cranking and initial combustion will be transmitted directly to the transmission output axle, generating so-called engine starting shock.

On the other hand, in the hybrid vehicle drive control system of illustrated embodiment, when the engine E is started under the EV mode and the gears are to be shifted, a common engaged clutch is selected as the second clutch CL2 from among the engaged clutches in the automatic transmission AT constituting the gear positions that are passed through when the engine E is started, and the torque transfer capacity of the second clutch CL2 is controlled based on slip engagement. As a result, when the engine E is started under the EV mode and the gears are shifted, simplified control logic will eliminate any loss of torque, and prevent engine starting shock from occurring.

In other words, the torque transfer capacity of the second clutch CL2 is controlled based on slip engagement when the engine E is started under the EV mode and the gears are shifted. Therefore, less fluctuation in the engine output torque generated in the period between cranking of the engine E and initial combustion is directly transmitted to the output shaft OUT, and any discomfort caused by engine starting shock can be minimized.

The common engaged clutch is further selected as the second clutch for torque transfer capacity control from among the engaged gear position clutches in the transmission 3 constituting the gear positions that are passed through when the engine E is started. Therefore, when the engine E is started, the need to change to another engaged clutch whose torque transfer capacity is to be controlled is obviated merely by the addition of simple control logic; i.e., the selection of a common engaged clutch. For example, if an engaged clutch that is to be controlled is changed while the engine E is starting, then a loss of torque will result from the sudden drop in torque transfer capacity during the change transition period. Conversely, such torque loss does not occur in illustrated embodiment because capacity control is maintained on a single common engaged clutch when the engine E is started accompanied by a shifting of gears.

Accordingly, simplified control logic eliminates torque loss when the engine E is started under the EV mode accompanied by a shifting of gears, and enables the incidence of engine starting shock to be prevented.

An example shall now be described in which the engine E is started and a downshift is performed (from $4^{th}$ gear→$2^{nd}$ gear) as a result of a kickdown operation performed by a driver. The engaged clutches in the $4^{th}$ gear are the input clutch C1, the high/low-reverse clutch C2, and the direct clutch C3. The clutch engaged in $2^{nd}$ gear is the direct clutch C3. Accordingly, the direct clutch C3 is selected as the common engaged clutch from the engaged clutches constituting the $2^{nd}$ gear and $4^{th}$ gear (shown by the dotted-line box in FIG. 8), which are passed through when the engine E is started. When the engine E is then started accompanied by a shifting of gears, the torque transfer capacity control based on a slip engagement control is performed only on the direct clutch C3 which is selected as the second clutch CL2 (i.e., the clutch whose capacity is to be controlled), even during shifting. Therefore, when the engine E is started accompanied by a shift from $4^{th}$ gear to $2^{nd}$ gear, the clutch for performing capacity control does not need to be changed, even during shifting, making it possible to prevent a loss of torque, which is a cause of diminished drive performance and shock.

When the engine E is started under the EV mode without being accompanied by a shifting of gears; e.g., as a result of a decrease in the battery SOC under the EV mode, the process flow based on the flowchart shown in FIG. 9 is step S1→step S2→step S3→step s4→step S5→step S6. In other words, in step S3, the clutch having the maximum torque transfer capacity among the clutches constituting the prevailing gear position in the automatic transmission AT is designated as the clutch CL_EnComm whose capacity is to be controlled. In step S4, the engine E is started. In step S5, the torque transfer capacity control is initiated for the designated clutch CL_EnComm whose capacity is to be controlled. In step S6, engine starting is concluded, and the operation shifts to the HEV mode at the point in time that the torque transfer capacity control of the clutch CL_EnComm whose capacity is to be controlled has ended.

If there are five prevailing gear positions in illustrated embodiment, as shown in FIG. 8, then the engaged gear position clutches constituting $5^{th}$ gear will be the input clutch C1 and the high/low-reverse clutch C2. If there are four prevailing gear positions in illustrated embodiment, then the engaged gear position clutches constituting $4^{th}$ gear will be the input clutch C1, the high/low-reverse clutch C2, and the direct clutch C3. If there are three prevailing gear positions in illustrated embodiment, then the engaged gear position clutches constituting $3^{rd}$ gear will be the high/low-reverse clutch C2 and the direct clutch C3. Accordingly, in each of the gear positions, maximum torque transfer capacity clutch is selected from among the engaged clutches as the clutch CL_EnComm whose capacity is to be controlled (i.e., the second clutch CL2).

Changes relating to the accelerator position, the torques, the rotational speeds, and the clutch torque capacities during engine starting caused by a decrease in the state of charge SOC of the battery 4 while operating in the EV mode are described according to the time chart shown in FIG. 11. Between the initiation of engine starting at time t1 and the conclusion of engine starting at time t2, the motor torque rises sharply and then decreases to negative torque, whereas the engine torque rises sharply from negative torque. The engine rotational speed gradually increases from the initiation of engine starting at time t1, until the value matches the motor speed at the conclusion of engine starting at time t2. The torque transfer capacity of the first clutch CL1 rises in the second stage due to the starting of the engine E by slip engagement of the first clutch CL1 after the initiation of engine starting at time t1, and a state of complete engagement is reached at substantially the same time as the conclusion of engine starting at time t2. On the other hand, the torque transfer capacity of the second clutch CL2 decreases only to a prescribed level, and is maintained at that reduced level so that fluctuation in the combination of motor torque and engine torque will be minimized.

From the conclusion of engine starting at time t2 to the start of the HEV mode at time t3, the motor torque fluctuates at the negative level, and the engine torque fluctuates at the positive level. The engine rotational speed remains the same as the motor speed. The torque transfer capacity of the first clutch CL1 is held at a level reflecting a state of complete engagement. On the other hand, the torque transfer capacity of the second clutch CL2 is gradually elevated at a gentle slope in accordance with the ramp characteristics and at time t3 reaches a level reflecting a state of complete engagement. In other words, the period between times t1 and t3 corresponds to the period during which the torque transfer capacity of the second clutch CL2 is controlled based on the slip engagement of the second clutch CL2.

The reasons that the clutch with maximum torque transfer capacity is selected as the second clutch CL2 are as follows. First, when the engine E is started, a lack of torque transfer capacity will not occur even if slip-engagement control is performed. Furthermore, vehicle operation will be stable, and any possibility of judder (conspicuous vibration) caused by deceleration from a loss of torque, or engine stall (stoppage) due to a sudden increase in engine load can be eliminated. Second, the clutch with the maximum torque transfer capacity has highly durable clutch-facing surfaces. Third, in a clutch with low torque transfer capacity, slipping will inevitably start before its proper timing during slip control. However, in a clutch with high torque transfer capacity, slip control will occur at the same time as slipping starts.

As has been described in the foregoing, the hybrid vehicle drive control system of illustrated embodiment is provided with maximum torque transfer capacity clutch detecting section (step S3) for detecting the maximum torque transfer capacity clutch having the maximum torque transfer capacity among engaged clutches in the automatic transmission AT constituting a gear position immediately prior to engine start, on the issuing of a command for the engine to be started without being accompanied by a shifting of gears. When the engine E is started from the EV mode without being accompanied by a shifting of gears, the hybrid vehicle drive control system selects the maximum torque transfer capacity clutch as the second clutch CL2, and controls the torque transfer capacity of the second clutch based on slip engagement.

Accordingly, when the engine E is started under the EV mode without being accompanied by a shifting of gears, a lack of torque transfer capacity will not occur even when the engine E is started, and the possibility of engine stall and judder will be eliminated. Moreover, no torque cutout will be experienced, and engine starting shock can be mitigated while clutch durability and optimal slip timing for the slip control can be ensured.

In the hybrid vehicle drive control system of illustrated embodiment, the Changes relating to the accelerator will reduce the torque transfer capacity of the second clutch CL2 that is completely engaged in order to hold the gear position during engine starting. Accordingly, engine starting shock that accompanies fluctuations in engine output torque can be mitigated by reducing the torque transfer capacity of the second clutch CL2 when engine starting under the EV mode without being accompanied by a shifting of gears is caused by a decrease in state of charge SOC of the battery 4 when under the EV mode or other reasons.

When engine starting is caused by such reasons as a kickdown operation performed by the driver under the EV mode operation and is accompanied by a shifting of gears, then the process flow based on the flowchart shown in FIG. 9 assuming there to be a single common engaged clutch is step S1→step S2→step S7→step S8→step S11→step s12→step S5→step S6. In other words, in step S11, following the decision in step S8 that only one clutch CL_EnComm whose capacity is to be controlled will remain engaged throughout shifting, the common engaged clutch is designated as the clutch CL_EnComm whose capacity is to be controlled. In step S112, the engine E is started. In step S5, the torque transfer capacity control is initiated for the designated clutch CL_EnComm whose capacity is to be controlled. In step S6, engine starting is concluded, and the operation shifts to the HEV mode at the point in time that the torque transfer capacity control for the clutch CL_EnComm whose capacity is to be controlled has ended.

If the shifting of gears in illustrated embodiment is $3^{rd}$ gear→$2^{nd}$ gear, as shown in FIG. 8, then the only common engaged clutch will be the direct clutch C3. If the shifting mode is $5^{th}$ gear→$4^{th}$ gear→$3^{rd}$ gear, then the only common engaged clutch will be the high/low-reverse clutch C2. If the shifting mode is $4^{th}$ gear→$3^{rd}$→$2^{nd}$ gear, then the only common engaged clutch will be the direct clutch C3.

When engine starting is caused by such reasons as a kickdown operation performed by the driver operation in the EV mode, and is accompanied by a shifting of gears, then the process flow based on the flowchart shown in FIG. 9 assuming there to be two or mores common engaged clutches is step S1→step S2→step S7→step S8→step S9→step S10→step S12→step S5→step S6. In other words, in step S9, following the decision in step S8 that two or more clutches CL_EnComm whose capacity is to be controlled remain engaged throughout shifting, then the maximum torque transfer capacity clutch CL_EnComm_MaxTqu is selected from the two or more clutches CL_EnComm whose capacity is to be controlled. In step S10, the selected maximum torque transfer capacity clutch CL_EnComm_MaxTqu is designated as the clutch CL_EnComm whose capacity is to be controlled. In step S12, the engine E is started. In step S5, the torque transfer capacity control is initiated for the designated clutch CL_EnComm whose capacity is to be controlled. In step S6, engine starting is concluded, and the operation shifts to the HEV mode at the point in time that the torque transfer capacity control for the clutch CL_EnComm whose capacity is to be controlled has ended.

If the shifting of gear in illustrated embodiment is $5^{th}$ gear→$4^{th}$ gear, as shown in FIG. 8, then there will be two common engaged clutches: the input clutch C1 and the high/low-reverse clutch C2. If the shifting of gears is $4^{th}$ gear→$3^{rd}$ gear, then there will be two common engaged clutches: the high/low-reverse clutch C2 and the direct clutch C3. Accordingly, the clutch CL_EnComm_MaxTqu with the higher torque transfer capacity of the two engaged clutches is designated as the clutch CL_EnComm whose capacity is to be controlled (i.e., second clutch CL2).

Changes relating to the accelerator, the torque, the rotational speed, and the clutch torque transfer capacity during engine starting caused by such reasons as a kickdown under the EV mode operation and accompanied by a shifting of gears are described according to the time chart shown in FIG. 11. Between the initiation of engine starting at time t1 and the conclusion of engine starting at time t2, the motor torque rises sharply, whereas the engine torque decreases to negative torque. The number of engine rotations gradually increases from the initiation of engine starting at time t1 until the value matches the motor speed at the conclusion of engine starting at time t2. The torque transfer capacity of first clutch CL1 rises in the second stage due to the starting of the engine by friction after the initiation of engine starting at time t1, and a state of complete engagement is reached at substantially the same time as the conclusion of engine starting at time t2. On the other hand, the torque transfer capacity of the second clutch CL2 decreases only to a prescribed level (larger than that encountered when the starting was caused by a decrease in the SOC), and is maintained at that reduced level so that fluctuation in the combination of motor torque and engine torque will be minimized.

From the conclusion of engine starting at time t2 to the start of HEV mode at time t3, the motor torque fluctuates after dropping from positive torque to negative torque, while the engine torque fluctuates after rising from negative torque to positive torque. The number of engine rotations remains the same as the motor speed. The torque transfer capacity of the first clutch CL1 is held in a state of complete engagement. On the other hand, the torque transfer capacity of the second clutch CL2 is held at the reduced level up until near the point in time that the accelerator depressing operation has ended, is then gradually elevated at a gentle slope in accordance with the ramp characteristics, and, at time t3, reaches a level reflecting a state of complete engagement. In other words, the period between times t1 and t3 corresponds to the period during which the second clutch CL2 is subjected to torque transfer capacity control based on slip engagement.

In the hybrid vehicle drive control system of illustrated embodiment, as described in the foregoing, when there is a plurality of common engaged clutches for the gear positions that are passed through when the engine E is started, the common engaged clutch detection section (steps S8 through S10) further selects the clutch with the maximum torque transfer capacity among the plurality of common engaged clutches as the second clutch CL2 whose maximum torque transfer capacity is to be controlled.

Accordingly, when the engine E is started under the EV mode accompanied by a shifting of gears, a lack of torque transfer capacity will not occur even when the engine E is started, and the possibility of engine stall and judder will be eliminated. Moreover, no torque cutout will be experienced, and engine starting shock can be mitigated while clutch durability and optimal slip timing for the slip control can be ensured.

In the hybrid vehicle drive control system of illustrated embodiment, the integrated controller 10 will reduce the torque transfer capacity of the second clutch CL2 that is completely engaged in order to hold the gear position during engine starting.

Accordingly, engine starting shock that accompanies fluctuations in engine output torque can be mitigated by reducing the torque transfer capacity of the second clutch CL2 when engine starting under the EV mode without being accompanied by a shifting of gears is caused by a kickdown operation performed by the driver when under the EV mode or other reasons.

The effect of the invention shall be described hereunder. Preferably, the hybrid vehicle drive control system for a hybrid vehicle of the illustrated embodiment allows the following effects to be obtained.

When the hybrid vehicle drive control system is configured according to the present invention, as described above, simplified control logic eliminates torque loss when the engine E is started under the EV mode and is accompanied by a shifting of gears, and enables the incidence of engine starting shock to be prevented.

When the hybrid vehicle drive control system is configured such that the maximum torque transfer capacity clutch detecting section (step S3) detects the maximum torque transfer capacity clutch having the maximum torque transfer capacity among engaged clutches in the automatic transmission AT constituting a gear position immediately prior to engine start on the issuing of a command for the engine to be started without being accompanied by a shifting of gears, and when the engine E is started from EV mode without being accompanied by a shifting of gears, then the integrated controller 10 selects the maximum torque transfer capacity clutch as the second clutch CL2, and controls the torque transfer capacity of the second clutch CL2 based on slip engagement. Accordingly, when the engine E is started under the EV mode without being accompanied by a shifting of gears, a lack of torque transfer capacity will not occur even when the engine E is started, and the possibility of engine stall and judder will be eliminated. Moreover, no torque cutout will be experienced, and engine starting shock can be mitigated while clutch durability and optimal slip timing for the slip control can be ensured.

When the hybrid vehicle drive control system is configured to determine if there is one or more common engaged clutches for the gear positions that are passed through when the engine E is started, then the common engaged clutch detection section (steps S8 through S10) selects the clutch with the maximum torque transfer capacity among the common engaged clutches as the second clutch CL2 whose maximum torque transfer capacity is to be controlled. Accordingly, when the engine E is started under the EV mode accompanied by a shifting of gears, a lack of torque transfer capacity will not occur even when the engine E is started, and the possibility of engine stall and judder will be eliminated. Moreover, no torque cutout will be experienced, and engine starting shock can be mitigated while clutch durability and optimal slip timing for the slip control can be ensured.

When the hybrid vehicle drive control system is configured such that the integrated controller 10 reduces the torque transfer capacity of the second clutch CL2 that is completely engaged in order to hold the gear position during engine starting, then engine starting shock that accompanies fluctuations in engine output torque can be mitigated by reducing the torque transfer capacity of the second clutch CL2 when the engine E is started under the EV mode accompanied by a shifting of gears or when the engine E is started under the EV mode without being accompanied by a shifting of gears.

The hybrid vehicle drive control system for a hybrid vehicle of the present invention has been described with reference to illustrated embodiment. However, the specific structure thereof shall not be limited to that of illustrated embodiment; any modifications, amendments, or other alterations to the design thereof are permitted provided that no departure is made from the main points of the present invention pertaining to the claims.

In illustrated embodiment, an example is given of a transmission with five forward gears and one reverse gear; however, the invention may also be used in an automatic transmission with four or even six or more forward gears. Several engaged clutches in the automatic transmission constitute the gear positions, and when any of the engaged clutches can be used as the second clutch, then the specific clutch in the transmission to be used as the second clutch during engine starting (i.e., the clutch whose capacity is to be controlled) will be indicated in the present invention.

In illustrated embodiment, when there is a plurality of common engaged clutches among the engaged clutches in the transmission constituting the gear positions that are passed through when the engine E is started, the integrated controller 10 further selects the maximum torque transfer capacity clutch from among the plurality of common engaged clutches to be the second clutch. However, when several common engaged clutches are present, the present invention can also be used to select a single clutch that has been determined in advance in accordance with the gear-shifting mode or as otherwise appropriate, irrespective of the maximum torque transfer capacity. The integrated controller 10 need not be limited to the description thereof in illustrated embodiment, provided that when the engine E is started under the EV mode accompanied by a shifting of gears, the means will select, as the second clutch, a common engaged clutch from among the engaged clutches in the transmission constituting the gear positions that are passed through when the engine E is started, and control the torque transfer capacity of the second clutch based on slip engagement.

The illustrated embodiment describes an example of application for a rear-wheel drive hybrid vehicle. However, the present invention can equally be used in front-wheel and four-wheel drive hybrid vehicles. The present invention may be used in a hybrid vehicle provided that the vehicle has a hybrid drive system in which a first clutch is interposed between an engine and a motor/generator, a second clutch is interposed between the motor/generator and drive wheels, and one of a plurality of clutches accommodated within a transmission is used as the second clutch.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A hybrid vehicle drive control system comprising:
   an engine;
   a motor/generator;
   a first clutch arranged between the engine and the motor/generator;
   a transmission including a plurality of gear position clutches arranged between the motor/generator and at least one drive wheel of a hybrid vehicle, with the gear position clutches being selectively engaged to obtain one of a plurality of vehicle running gears, the plurality of gear position clutches of the transmission having a first common engaged clutch that remains engaged throughout a first shifting mode and a second common engaged clutch that remains engaged throughout a second shifting mode, the first and second shifting modes being different gear shifts from one of the vehicle running gears to a different one of the vehicle running gears; and
   a controller that selectively starts the engine by using torque transmitted from the first clutch during a mode change from an electric drive mode in which the first clutch is released to a hybrid drive mode in which the first clutch is engaged in response to an engine start command being issued while the hybrid vehicle is running in the electric drive mode with the motor/generator being used as a power source for driving the drive wheel of the hybrid vehicle,
   the controller selecting a second clutch that is detected as being a common engaged clutch, with the second clutch being the first common engaged clutch in response to the controller performing the first shifting mode and with the second clutch being the second common engaged clutch in response to the controller performing the second shifting mode during a period lasting from immediately before starting the engine until immediately after starting the engine in response to the engine start command being issued to start the engine and the gear shifting operation occurring during the mode change from the electric drive mode to the hybrid drive mode, and executing a slip control of the second clutch in response to the first clutch being connected to start the engine during the mode change from the electric drive mode to the hybrid drive mode.

2. The hybrid vehicle drive control system as set forth in claim 1, wherein
   the controller selects the second clutch to be slip controlled by detecting which of the gear position clutches that are engaged to constitute the vehicle running gears which are engaged immediately prior to starting the engine in response to the engine start command having a maximum torque transfer capacity, upon detecting that no gear shifting operation is occurring during the mode change from the electric drive mode to the hybrid drive mode.

3. The hybrid vehicle drive control system as set forth in claim 1, wherein
   the controller selects the second clutch to be slip controlled by detecting which of the gear position clutches has a maximum torque transfer capacity from among a plurality of common engaged clutches that are engaged to constitute the vehicle running gears which are engaged during the period lasting from immediately before starting the engine until immediately after starting the engine in response to the engine start command being issued to start the engine and the gear shifting operation occurring during the mode change from the electric drive mode to the hybrid drive mode.

4. The hybrid vehicle drive control system as set forth in claim 1, wherein
   the controller reduces a torque transfer capacity of the second clutch to be slip controlled in response to a completely engaged clutch from among the gear position clutches being selected as the second clutch.

5. The hybrid vehicle drive control system as set forth in claim 2, wherein
   the controller selects the second clutch to be slip controlled by detecting which of the gear position clutches has a maximum torque transfer capacity from among a plurality of common engaged clutches that are engaged to constitute the vehicle running gears which are engaged during the period lasting from immediately before starting the engine until immediately after starting the engine when the engine start command is issued to start the engine and the gear shifting operation is occurring during the mode change from the electric drive mode to the hybrid drive mode.

6. The hybrid vehicle drive control system as set forth in claim 2, wherein
   the controller reduces a torque transfer capacity of the second clutch to be slip controlled in response to a completely engaged clutch from among the gear position clutches being selected as the second clutch.

7. The hybrid vehicle drive control system as set forth in claim 3, wherein
   the controller reduces a torque transfer capacity of the second clutch to be slip controlled in response to a completely engaged clutch from among the gear position clutches being selected as the second clutch.

8. The hybrid vehicle drive control system as set forth in claim 5, wherein
   the controller reduces a torque transfer capacity of the second clutch to be slip controlled in response to a completely engaged clutch from among the gear position clutches being selected as the second clutch.

9. A hybrid vehicle drive control system comprising:

first power supply means for supplying a first source of power in a hybrid drive mode;

second power supply means for supplying a second source of power at least in an electric drive mode;

first power transfer means for selectively changing a torque transfer capacity between the first and second power supply means;

vehicle running gear changing means for selectively changing a gear position among a plurality of vehicle running gear of a hybrid vehicle between the first and second power supply means and at least one drive wheel of a hybrid vehicle, the vehicle running gear changing means including a plurality of frictional engaging means for selectively attaining the vehicle running gears, the plurality of frictional engaging means having a first common engaged clutch that remains engaged throughout a first shifting mode and a second common engaged clutch that remains engaged throughout a second shifting mode, the first and second shifting modes being different gear shifts from one of the vehicle running gears to a different one of the vehicle running gears; and control means for selectively starting the first power supply means by using torque transmitted from the first power transfer means during a mode change from the electric drive mode to a hybrid drive mode when a first power supply start command is issued while the hybrid vehicle is running in the electric drive mode with the second power supply being used as a power source for driving the drive wheel of the hybrid vehicle, the control means further including functions of selecting one of the frictional engaging means that is detected as being a common engaged clutch, with the one of the frictional engaging means being the first common engaged clutch in response to the control means performing the first shifting mode and with the one of the frictional engaging means being the second common engaged clutch in response to the control means performing the second shifting mode during an engine starting process when the first power supply start command is issued to start the first power supply means and the gear shifting operation is occurring during the mode change from the electric drive mode to the hybrid drive mode, and executing a slip control of the frictional engaging means that was detected as being the common engaged clutch when the first power transfer means is being connected to start the first power supply means during the mode change from the electric drive mode to the hybrid drive mode.

10. A hybrid vehicle drive control method comprising:

selectively operating a first clutch arranged between an engine and a motor/generator;

selectively operating gear position clutches of a transmission arranged between a motor/generator and at least one drive wheel of a hybrid vehicle, with the gear position clutches being selectively engaged to obtain one of a plurality of vehicle running gears, the gear position clutches of the transmission having a first common engaged clutch that remains engaged throughout a first shifting mode and a second common engaged clutch that remains engaged throughout a second shifting mode, the first and second shifting modes being different gear shifts from one of the vehicle running gears to a different one of the vehicle running gears;

selectively starting the engine by using torque transmitted from the first clutch during a mode change from an electric drive mode in which the first clutch is released to a hybrid drive mode in which the first clutch is engaged when an engine start command is issued while the hybrid vehicle is running in the electric drive mode with the motor/generator being used as a power source for driving the drive wheel of the hybrid vehicle;

selecting a second clutch that is detected as being a common engaged clutch, with the second clutch being the first common engaged clutch in response to the first shifting mode and with the second clutch being the second common engaged clutch in response to the second shifting mode during a period lasting from immediately before starting the engine until immediately after starting the engine when the engine start command is issued to start the engine and the gear shifting operation is occurring during the mode change from the electric drive mode to the hybrid drive mode; and executing a slip control of the second clutch when the first clutch is being connected to start the engine during the mode change from the electric drive mode to the hybrid drive mode.

* * * * *